US009363418B2

(12) United States Patent
Nitta

(10) Patent No.: US 9,363,418 B2
(45) Date of Patent: Jun. 7, 2016

(54) ELECTRONIC APPARATUS

(71) Applicant: KYOCERA Document Solutions Inc., Osaka (JP)

(72) Inventor: Ryuichi Nitta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/799,136

(22) Filed: Jul. 14, 2015

(65) Prior Publication Data

US 2016/0028924 A1 Jan. 28, 2016

(30) Foreign Application Priority Data

Jul. 28, 2014 (JP) ................................ 2014-152745

(51) Int. Cl.
*G06F 17/30* (2006.01)
*H04N 1/44* (2006.01)
*H04N 1/00* (2006.01)
*G06F 3/12* (2006.01)

(52) U.S. Cl.
CPC ......... *H04N 1/4433* (2013.01); *H04N 1/00129* (2013.01); *H04N 1/00411* (2013.01); *H04N 1/00413* (2013.01); *H04N 1/00493* (2013.01); *H04N 1/4413* (2013.01); *H04N 2201/0094* (2013.01)

(58) Field of Classification Search
CPC ........... G06F 21/41; G06F 21/31; G06F 3/12; H04N 1/00323; H04N 1/00856; H04N 1/4413; H04N 1/4433; H04N 1/00408; H04N 1/00411; H04N 1/00501; H04N 1/00506; H04N 1/00509; H04N 1/00514; H04N 2201/0075; G06K 15/4095; G07C 9/00; H04L 63/08; H04L 63/0815; H04L 63/083; H04L 63/0853; H04L 63/0861

USPC ............ 358/1.11–1.18; 726/1–5, 8, 9, 26–29; 713/182, 183, 185

See application file for complete search history.

(56) References Cited

U.S. PATENT DOCUMENTS

| 8,060,928 | B2 | 11/2011 | Muto | |
|---|---|---|---|---|
| 2002/0083012 | A1* | 6/2002 | Bush | G06Q 20/3821 705/76 |
| 2010/0223668 | A1* | 9/2010 | Koo | G06F 21/552 726/22 |

(Continued)

FOREIGN PATENT DOCUMENTS

| JP | 09-319448 A | 12/1997 |
|---|---|---|
| JP | 2008-262338 A | 10/2008 |

(Continued)

*Primary Examiner* — Chad Dickerson
(74) *Attorney, Agent, or Firm* — Studebaker & Brackett PC

(57) ABSTRACT

An electronic apparatus operated by a remote operation device includes a log-in managing part and a display controlling part. When log-in operation inputting log-in information is carried out, if a log-in user to the electronic apparatus does not exist, the log-in managing part logs-in the user to the electronic apparatus. When log-out operation logging-out the user from the electronic apparatus is carried out, the log-in managing part logs-out the user from the electronic apparatus. If the log-in managing part logs-out the user from the electronic apparatus, the display controlling part displays a re-login key for re-login of a log-out user on the remote operation device without inputting the log-in information. If operation of the re-login key is carried out, the log-in managing part logs-in the log-out user to the electronic apparatus by using the log-in information used when the log-out user is precedingly logged-in to the electronic apparatus.

5 Claims, 6 Drawing Sheets

(56) References Cited

U.S. PATENT DOCUMENTS

| | | | |
|---|---|---|---|
| 2012/0124676 A1* | 5/2012 | Griffin | G06Q 20/12 726/28 |
| 2013/0194632 A1* | 8/2013 | Kishimoto | G06F 3/12 358/1.15 |
| 2014/0153031 A1* | 6/2014 | Toyamasaki | G07C 9/00 358/1.14 |
| 2015/0074786 A1* | 3/2015 | Hwang | H04L 63/0861 726/9 |

FOREIGN PATENT DOCUMENTS

| | | | |
|---|---|---|---|
| JP | 2009-181252 A | | 8/2009 |
| JP | 2009181252 A | * | 8/2009 |

\* cited by examiner

ELECTRONIC APPARATUS

INCORPORATION BY REFERENCE

This application is based on and claims the benefit of priority from Japanese Patent application No. 2014-152745 filed on Jul. 28, 2014, the entire contents of which are incorporated herein by reference.

BACKGROUND

The present disclosure relates to an electronic apparatus operated by a remote operation device, particularly, a technique logging-in a user of the remote operation device to the electronic apparatus.

Conventionally, an electronic apparatus, such as an image forming apparatus (e.g. a multifunction peripheral) and television, operatable by using a remote operation device, such as a smart phone and a tablet terminal, is known. In such an electronic apparatus, in order to avoid unspecified user from using the electronic apparatus by using the remote operation device, it is configured so as to authorize a user logged-in to the electronic apparatus to operate the electronic apparatus.

Concretely, at first, in order to log-in the user to the electronic apparatus, the electronic apparatus carries out decision process whether or not the user is an authentication user authorized to use the electronic apparatus. The user decided as the authentication user in the decision process becomes a state logged-in to the electronic apparatus to become possible to operate the electronic apparatus. Then, the user having finished operation of the electronic apparatus carries out log-out operation logging-out from the electronic apparatus. Thereby, the electronic apparatus becomes a state capable of authorizing log-in of another user.

For example, the decision process makes the user input log-in information, such as user identification (ID) and a password, identifying the user and decides whether or not inputted log-in information agrees with prestored log-in information in the electronic apparatus corresponding to the authentication user. In such deciding, the user inputted the log-in information and decided as agreement is decided as the authentication user.

The user of the remote operation device may notice unfinished remote operation just after log-out operation due to mistake of finishing of the remote operation of the electronic apparatus. However, in such a case, because the user is already logged-out from the electronic apparatus, the user must be logged-in to the electronic apparatus again in order to carry out the unfinished remote operation. At that time, because the user needs to consume time and labor inputting the log-in information again even through the user was in a state logged-in to the electronic apparatus until just before, the user may feel inconvenience.

SUMMARY

In accordance with one aspect of the present disclosure, an electronic apparatus is an electronic apparatus operated by a remote operation device to include a log-in managing part and a display controlling part. The log-in managing part is configured so as, in a case where log-in operation inputting log-in information is carried out by a user in the remote operation device, if a log-in user logging-in to the electronic apparatus does not exist, to log-in the user to the electronic apparatus, and, in a case where log-out operation logging-out the user from the electronic apparatus is carried out by the user in the remote operation device, to log-out the user from the electronic apparatus. The display controlling part is configured so as, if the log-in managing part logs-out the user from the electronic apparatus, to display a re-login key asking of re-login of a log-out user logged-out from the electronic apparatus on a displaying part of the remote operation device without inputting the log-in information. Moreover, the log-in managing part is configured, if operation of the re-login key is carried out in the remote operation device, so as to log-in the log-out user to the electronic apparatus by using the log-in information used when the log-out user is precedingly logged-in to the electronic apparatus.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

In the following, an embodiment of an electronic apparatus according to the present disclosure will be described with reference to the drawings. Incidentally, in the embodiment, although the electronic apparatus is described with taking a multifunction peripheral as an example, the electronic apparatus is not restricted by this. The electronic apparatus may be, for example, an image forming apparatus (e.g. a facsimile device, a copying machine, a scanner or a printer), television or the like.

Figure 1:
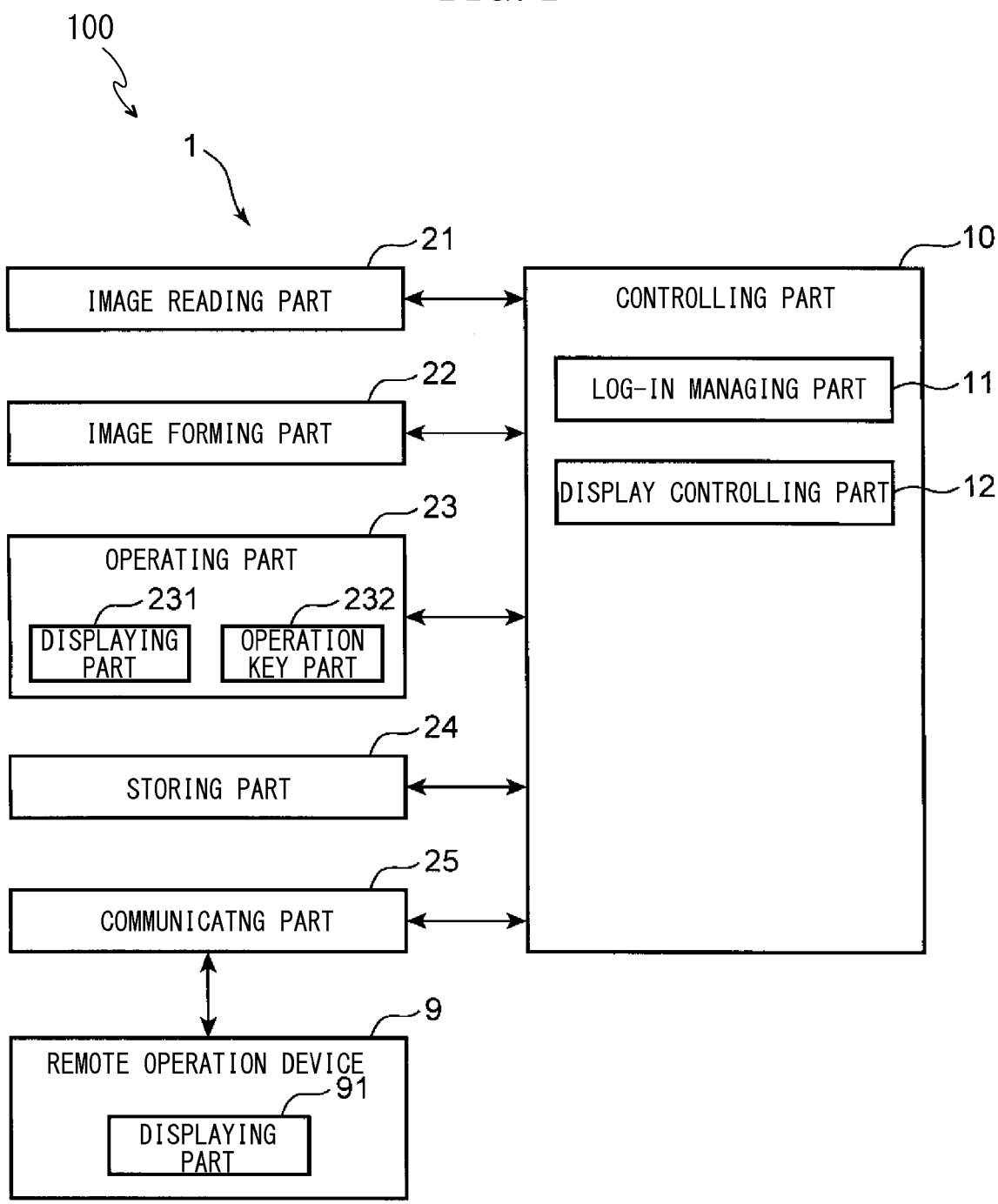
FIG. 1 is a block diagram showing an electrical structure of a multifunction peripheral according to an embodiment of an electronic apparatus in accordance with the present disclosure.

FIG. 1 is a block diagram showing an electrical structure of the multifunction peripheral 1 according to the embodiment of the electronic apparatus in accordance with the present disclosure. As shown in FIG. 1, the multifunction peripheral 1 includes an image reading part 21, an image forming part 22, an operating part 23, a storing part 24, a communicating part 25 and a controlling part 10. The multifunction peripheral 1 is configured so as to be remotely operated by a remote operation device 9, such as a smart phone and a tablet terminal.

That is, FIG. 1 shows a remote operation system 100 remotely operating the multifunction peripheral 1 by remote operation device 9.

The image reading part 21 includes an optical unit (not shown) having a CCD (Charged Coupled Device) line sensor and an exposure lump and others. The image reading part 21 is controlled by the controlling part 10 so as to make the optical unit read an image of a document, to create image data representing the image of the document and to output the image data to the controlling part 10.

The image forming part 22 is controlled by the controlling part 10 so as to form the image represented by the image data inputted to the controlling part 10 onto a sheet. Incidentally, to the controlling part 10, the image data created by the above-mentioned image reading part 21, image data received from an external device by the communication part 25 as described later and others are inputted.

Concretely, the image forming part 22 has known structure including a photosensitive drum, a charging part, an exposing part, a developing part, a cleaning part and others. The charging part is arranged to face to a circumference face of the photosensitive drum. The exposing part is arranged to face to a circumference face of the photosensitive drum at a downstream side of the charging part. The developing part is arranged to face to a circumference face of the photosensitive drum at a downstream side of the exposing part. The cleaning part is arranged to face to a circumference face of the photosensitive drum at a downstream side of the developing part. Because image forming action forming the image on the sheet by the image forming part 22 is known, its description is omitted.

The operating part 23 includes a displaying part 231 displaying information and an operation key part 232 allowing a user to carry out various operation. The displaying part 231 is a liquid crystal display or the like having a touch panel function to display various information. The operation key part 232 includes various keys, for example, numeric keys for inputting numerical values and marks, cursor keys for moving a pointer (a cursor) displayed on the displaying part 231 and others.

The storing part 24 is a storage device, such as an HDD (Hard Disk Drive) or an SSD (Solid State Drive). In the storing part 24, log-in information used for authenticating an authentication user as a user authorized to use the multifunction peripheral 1 in advance is stored with being associated with each of a plurality of authentication users. The log-in information is composed of, for example, a user name identifying each authentication user and a password inputted when the authentication user is authenticated.

The communicating part 25 is a communication interface circuit used for communication between the remote operation device 9 or an external device (not shown), such as a personal computer, and the controlling part 10 via a LAN (Local Area Network) or the like.

The controlling part 10 controls action of each component of the multifunction peripheral 1. Concretely, the controlling part 10 includes a CPU (Central Processing Unit) (not shown) executing predetermined arithmetic processes, a nonvolatile memory (not shown), such as an EEPROM (Electrically Erasable Programmable Read Only Memory), storing predetermined control programs, a RAM (Random Access Memory) (not shown) storing temporarily data, a timer (not shown) clocking a current time, their peripheral circuits and others.

The controlling part 10 works, for example, as a log-in managing part 11 and a display controlling part 12 by making the CPU execute the control program stored in the nonvolatile memory or the like. The log-in managing part 11 and the display controlling part 12 will be described later in detail.

The remote operation device 9 includes a displaying part 91 composed of a liquid crystal display or the like having a touch panel function. The remote operation device 9 displays an operation screen used for operation the multifunction peripheral 1, a software keyboard used for inputting various information to the operation screen and others on the displaying part 91.

That is, a user of the remote operation device 9 touch-operates keys on the operation screen and the software keyboard displayed on the displaying part 91 to input a first execution instruction of a first function to be executed in the multifunction peripheral 1. The remote operation device 9 transmits the first execution instruction of the first function inputted by the user to the controlling part 10 via the communicating part 25. The controlling part 10 executes the first function in accordance with the first execution instruction of the first function received from the remote operation device 9. Thus, the remote operation device 9 remotely operates the multifunction peripheral 1 by transmitting the first execution instruction of the first function inputted by the user to the controlling part 10 via the communicating part 25.

The controlling part 10 executes the first function, and then, replies a second execution instruction of a second function to be executed in the remote operation device 9 in accordance with executed result of the first function to the remote operation device 9 by using the communicating part 25. The remote operation device 9 execute the second function in accordance with the second execution instruction of the second function replied from the multifunction peripheral 1. Thus, the controlling part 10 makes the remote operation device 9 work in accordance with result of remote operation carried out by the remote operation device 9 by using the communicating part 25 to reply the second execution instruction of the second function to the remote operation device 9 remotely operating the multifunction peripheral 1.

Figure 2:
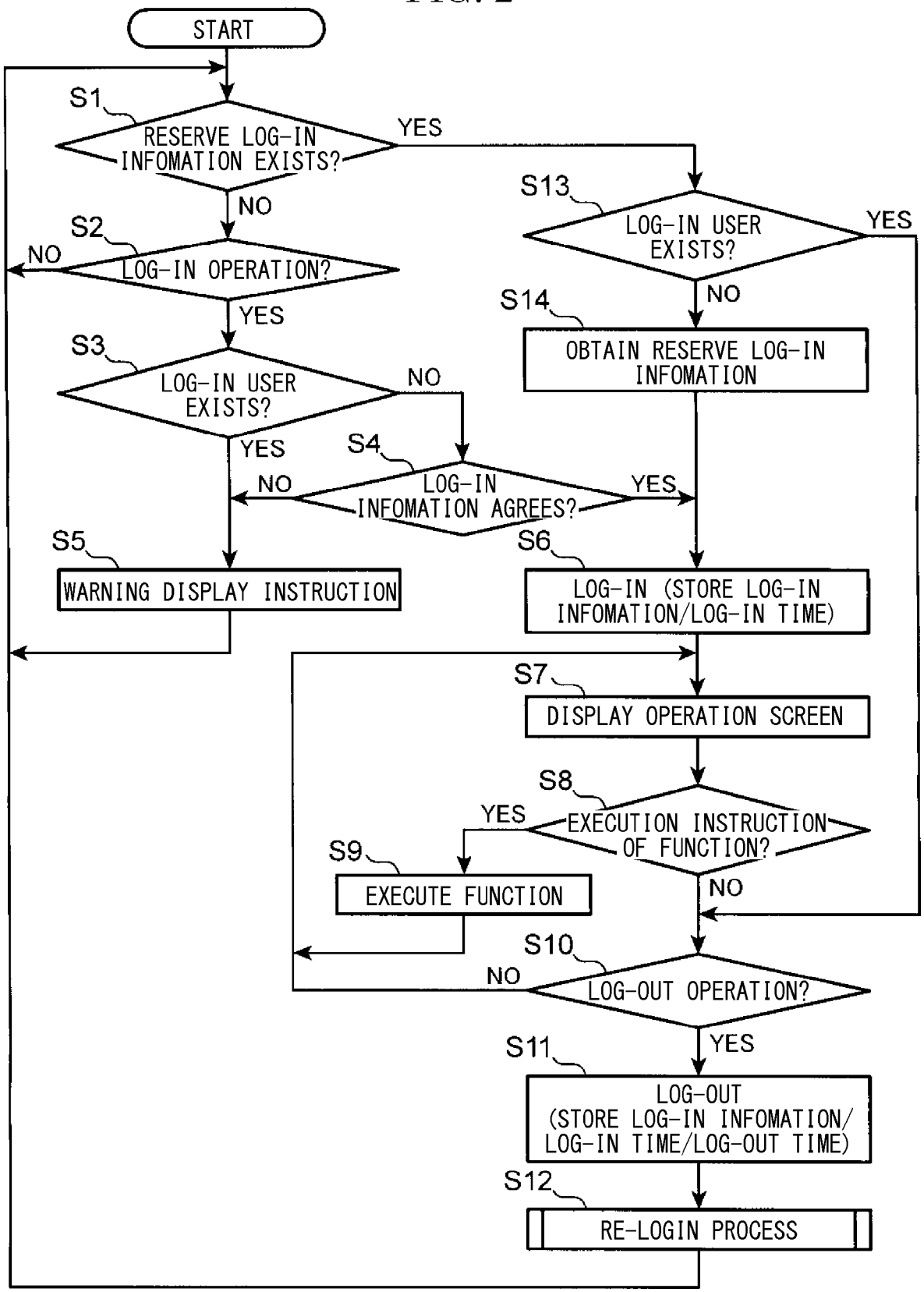
FIG. 2 is a flowchart useful for understanding action of the multifunction peripheral when being remotely operated by a remote operation device.

In the following, an action of the multifunction peripheral 1 when being remotely operated by the remote operation device 9 will be described. In this description, the log-in managing part 11 and the display controlling part 12 will be described in detail. FIG. 2 is a flowchart useful for understanding the action of the multifunction peripheral 1 when being remotely operated by the remote operation device 9.

As shown in FIG. 2, in a case where reserve log-in information mentioned later is not stored in the RAM in the controlling part 10 (step S1: NO), log-in operation may be carried out in the remote operation device 9 (step S2: YES). The log-in operation shows operation inputting the log-in information and transmitting a log-in instruction to the controlling part 10 via the communicating part 25, wherein the log-in instruction asking to log-in the user of the remote operation device 9 to the multifunction peripheral 1 by using the inputted log-in information.

Figure 3:
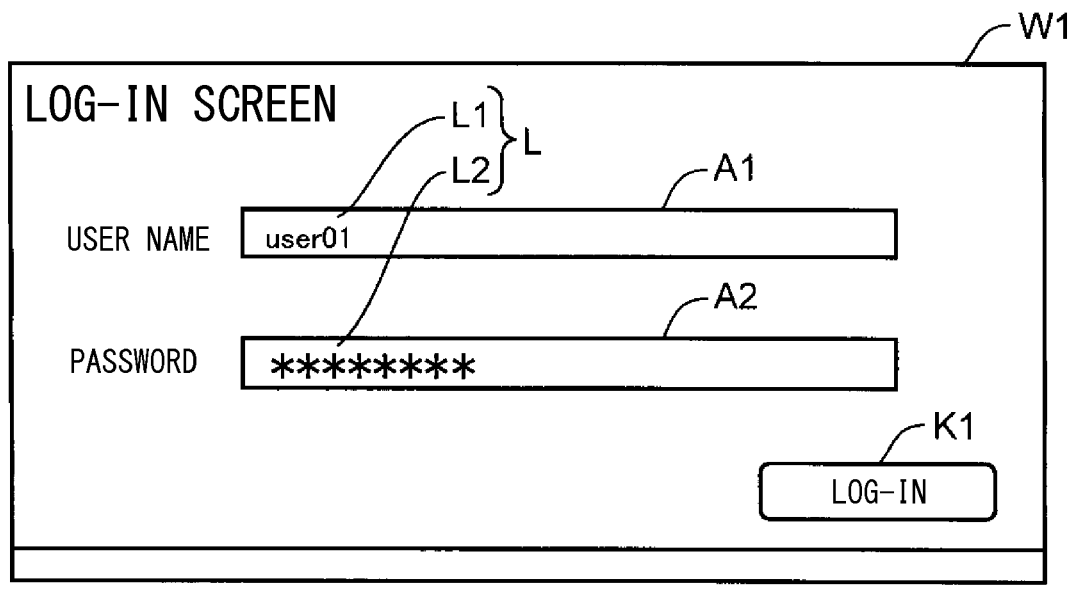
FIG. 3 is a plan view showing a log-in operation screen displayed in a displaying part of the remote operation device.

FIG. 3 is a plan view showing a log-in operation screen W1 displayed in the displaying part 91 of the remote operation device 9. Concretely, a case where the user of the remote operation device 9 touch-operates an icon displayed on the displaying part 91 for starting application software remotely operating the multifunction peripheral 1 may be considered. In such a case, the remote operation device 9 displays the log-in operation screen W1 shown in FIG. 3 on the displaying part 91. In addition, the remote operation device 9 displays the software keyboard (not shown) on the displaying part 91.

The user of the remote operation device 9 touch-operates the above-mentioned software keyboard to input a user name L1 into a user name column A1 and to input a password L2 into a password column A2. Subsequently, when the user of the remote operation device 9 touch-operates a log-in key K1, the remote operation device 9 transmits the log-in instruction containing log-in information L composed of the user name L1 and the password L2 to the controlling part 10 via the communicating part 25. Thus, the log-in operation is carried out by two operation of inputting operation of the user name L1 and the password L2 and touch operation of the log-in key K1.

When the log-in operation is carried out in the remote operation device 9 (step S2: NO) and the controlling part 10 receives the log-in instruction containing the log-in information L, the log-in managing part 11 starts process logging-in the user inputted the log-in information L contained in the log-in instruction to the multifunction peripheral 1. The log-in managing part 11 firstly decides whether or not a log-in user logging-in to the multifunction peripheral 1 exists (step S3). A decision way of step S3 will be described later in detail.

If the log-in managing part 11 decides at step S3 that the log-in user does not exist (step S3: NO), the log-in managing part 11 decides whether or not the log-in information L contained in the log-in instruction agrees with any of the log-in information associated with the authentication users stored in the storing part 24 (step S4).

At step S4, if the log-in managing part 11 decides that the log-in information L contained in the log-in instruction agrees with any of the log-in information stored in the storing part 24 (step S4: YES), the log-in managing part 11 authenticates that the user (hereinafter, so-called as a remote user) of the remote operation device 9 inputted the log-in information L is the authentication user. In such a case, the log-in managing part 11 logs-in the remote user to the multifunction peripheral 1 (step S6).

Concretely, at step S6, the log-in managing part obtains the current time by using the timer in the controlling part 10. The log-in managing part 11 sets the obtained current time as a log-in time when the remote user is logged-in to the multifunction peripheral 1. Subsequently, the log-in managing part 11 stores the log-in information L contained in the log-in instruction received from the remote operation device 9 and the log-in time with associating with each other in the RAM.

If the log-in managing part 11 makes the remote user log-in to the multifunction peripheral 1 (step S6), the display controlling part 12 replies an execution instruction of a displaying function of any of various operation screens to the remote operation device 9 (step S7). Incidentally, the display controlling part 12 replies the execution instruction of the displaying function of the operation screen with containing the user name L1 contained in the log-in information L stored in the RAM at step S6. In addition, the display controlling part 12 replies the execution instruction of the displaying function of the operation screen with containing information to be displayed in the operation screen.

If the remote operation device 9 receives the execution instruction of the displaying function of the operation screen, the remote operation device 9 displays the operation screen on the displaying part 91 in according to the execution instruction. Subsequently, if the remote user uses any of various operation screens displayed on the displaying part 91 to input the first execution instruction of any of various functions (the first function) (step S8: YES) and the remote operation device 9 transmits the first execution instruction of the first function to the controlling part 10, the controlling part 10 execute the first function in accordance with the received first execution instruction (step S9). After that, the action is returned to step S7.

Figure 4:
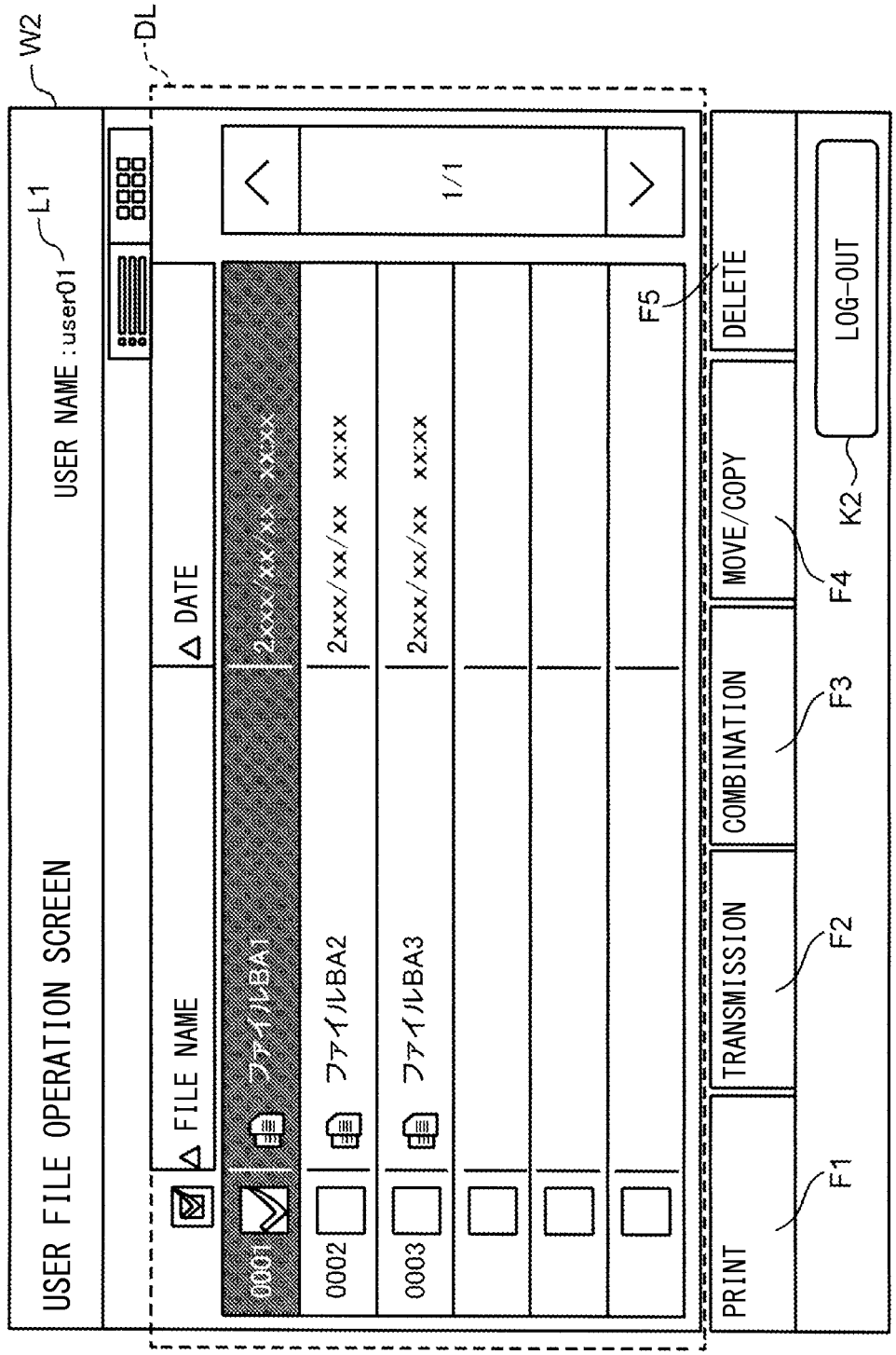
FIG. 4 is a plan view showing a user file operation screen displayed in the displaying part of the remote operation device.

FIG. 4 is a plan view showing a user file operation screen W2 displayed in the displaying part 91 of the remote operation device 9. For example, a case where the remote operation device 9 receives the execution instruction of the displaying function of the user file operation screen W2 replied at step S7 by the display controlling part 12 may be considered. In such a case, the remote operation device 9 displays the user file operation screen W2 shown in FIG. 4 on the displaying part 91.

On the user file operation screen W2, the user name L1 contained in the execution instruction of the displaying function of the user file operation screen W2, a user file list DL, a print instruction key F1, a transmission instruction key F2, a combination instruction key F3, a movement/copy instruction key F4, a deletion instruction key F5 and a log-out key K2 are displayed.

In the user file list DL, combinations of name of an electronic file representing each image data used when the remote user carries out the function of the multifunction peripheral 1 in the past (a file name column in FIG. 4) and the date and time when the function using each image data is executed (a date and time column in FIG. 4) are listed and displayed. Each combination listed and displayed in the user file list DL can be selected by touch operation. Incidentally, the display controlling part 12 replies the execution instruction of the displaying function of the user file operation screen W2 with containing information indicating each combination to be listed and displayed in the user file list DL at step S7.

The print instruction key F1 is provided so as to input an execution instruction of a printing function forming the image on the sheet, wherein the image is represented by the image data (hereinafter, called as a selected image data) corresponding to selected combination out of combinations listed and displayed in the user file list DL. The transmission instruction key F2 is provided so as to input an execution instruction of a transmitting function transmitting the selected image data to another apparatus. The combination instruction key F3 is provided so as to input an execution instruction of a combining function combining two or more selected image data. The movement/copy instruction key F4 is provided so as to input an execution instruction of a moving function moving a stored destination of the selected image data and a copying function copying the selected image data. The deletion instruction key F5 is provided so as to input an execution instruction of a deleting function deleting the selected image data.

For example, if the remote user touch-operates the print instruction key F1, the execution instruction of the printing function using the selected image data is inputted (step S8: YES). When the execution instruction of the printing function is transmitted to the controlling part 10, the controlling part 10 executes the printing function using the selected image data in accordance with the received execution instruction (step S9). Concretely, the controlling part 10 makes the image forming part 22 form the image represented by the selected image data onto the sheet at step S9.

The log-out key K2 is provides so as to input a log-out instruction asking to log-out the remote user indicated by the user name L1 displayed on the user file operation screen W2 from the multifunction peripheral 1.

That is, if the remote user carries out log-out operation touch-operating the log-out key K2 (step S10: YES), the remote operation device 9 transmits the log-out instruction containing the user name L1 to the controlling part 10 via the communicating part 25. The log-in managing part 11 logs-out the remote user indicated by the user name L1 contained in the log-out instruction from the multifunction peripheral 1 (step S11).

Concretely, at step S11, the log-in managing part obtains the current time by using the timer in the controlling part 10. The log-in managing part 11 sets the obtained current time as a log-out time when the remote user indicated by the user name L1 contained in the log-out instruction is logged-out from the multifunction peripheral 1. Subsequently, the log-in managing part 11 stores the log-out time with associating with the log-in information L containing the user name L1 stored in the RAM.

That is, the log-in managing part 11 confirms at step S3 whether or not the log-in information L associated with the log-in time and not associated with the log-out time is stored in the RAM and, according to the confirmed result, decides whether or not the log-in user logging-in to the multifunction peripheral 1 exists.

On the other hand, if the log-in managing part 11 decides at step S3 that the log-in user exists (step S3: YES) or if the log-in managing part 11 decides at step S4 that the log-in information L does not agree with any of the log-in information stored in the storing part 24 (step S4: NO), the log-in managing part 11 replies an execution instruction of a warning displaying function to the remote operation device 9 (step S5).

The warning displaying function is a function making the remote operation device 9 display a message warning an impossibility of log-in on the displaying part 91. When the remote operation device 9 receives the execution instruction of the warning displaying function, the remote operation device 9 displays the message warning the impossibility of the log-in on the displaying part 91. After step S5 is executed, the action is returned to step S1.

At step S11, if the log-in managing part 11 logs-out the remote user from the multifunction peripheral 1, the controlling part 10 executes, in addition to the action shown in FIG. 2, re-login process using the log-in information L containing the user name L1 inputted by the logged-out remote user and stored in the RAM (step S12). After step S12 is executed, the action is returned to step S1.

Figure 5:
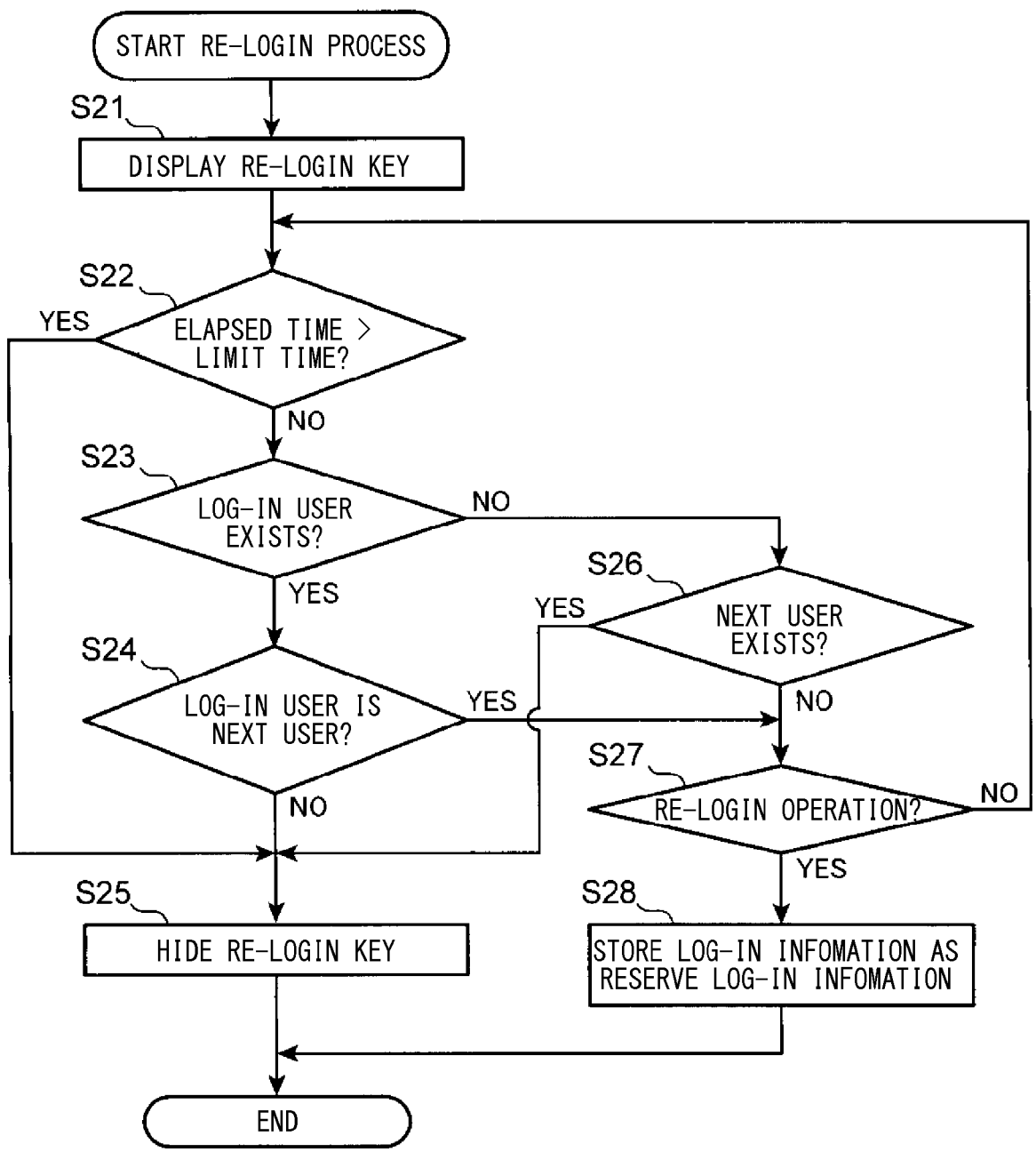
FIG. 5 is a flowchart useful for understanding action of re-login process.

In the following, the re-login process at step S12 together with step S1, step S13 and step S14 will be described in detail. Incidentally, hereinafter, the remote user logged-out from the multifunction peripheral 1 at step S11 is called as a log-out user. Moreover, the log-in information L containing the user name L1 inputted by the log-out user and stored in the RAM is called as a log-out user's log-in information L. FIG. 5 is a flowchart useful for understanding action of the re-login process.

As shown in FIG. 5, if the controlling part 10 executes at step S12 (refer to FIG. 2) to start the re-login process using the log-out user's log-in information L, the display controlling part 12 replies an execution instruction of a re-login key displaying function to the remote operation device 9 (step S21). The re-login key displaying function is a function making the remote operation device 9 display a re-login key inputting a re-login instruction on the displaying part 91 and the re-login instruction represents asking of re-login of the log-out user without inputting the log-in information L.

The display controlling part 12 further stores, at step S21, a time of replying of the execution instruction of the re-login key displaying function in the RAM. The display controlling part 12 moreover replies the execution instruction of the re-login key displaying function with containing the user name L1 contained in the log-out user's log-in information L.

Figure 6:
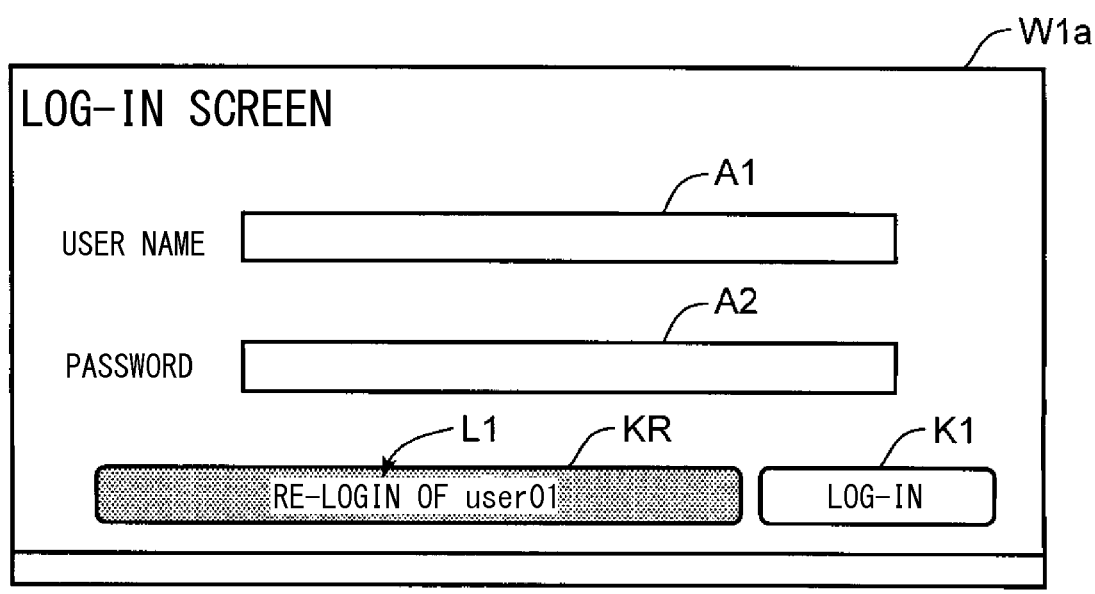
FIG. 6 is a plan view showing the log-in operation screen, on which a re-login key is displayed.

For example, a case where the remote user carries out the log-out operation (step S10: YES, in FIG. 2) and the remote user is logged-out from the multifunction peripheral 1 (step S11 in FIG. 2) may be considered. In addition, execution of the re-login process using the log-out user's log-in information L may be started (step S12). FIG. 6 is a plan view showing a log-in operation screen W1a, on which a re-login key KR is displayed.

In such a case, at step S21, if the display controlling part 12 replies the execution instruction of the re-login key displaying function to the remote operation device 9 (step S21), the remote operation device displays, as shown in FIG. 6, the log-in operation screen W1a with displaying the re-login key KR on the displaying part 91 in accordance with the received execution instruction of the re-login key displaying function. At this time, the remote operation device 9 display a label of the re-login key KR with containing the user name L1 contained in the received execution instruction.

With reference to FIG. 5, the display controlling part 12 decides whether or not an elapsed time from the time of replying of the execution instruction of the re-login key displaying function stored in the RAM to the current time exceeds a predetermined limit time (step S22). The limit time is determined as a conceivable time (e.g. 5 minutes) required from log-in to log-out in the multifunction peripheral 1 for the remote user and stored in the nonvolatile memory in the controlling part 10.

If the display controlling part 12 decides at step S22 that the elapsed time does not exceed the limit time (step S22: NO), the display controlling part 12 decides whether or not the log-in user logging-in to the multifunction peripheral 1 exists (step S23).

Concretely, the display controlling part 12 confirms at step S23, similarly to step S3, whether or not the log-in information L associated with the log-in time and not associated with the log-out time is stored in the RAM and, according to the confirmed result, decides whether or not the log-in user logging-in to the multifunction peripheral 1 exists.

If the display controlling part 12 decides at step S23 that the log-in user exists (step S23: YES), the display controlling part 12 decides whether or not the log-in user is a next user logged-in next to the log-out user (step S24).

Concretely, at step S24, the display controlling part 12 firstly obtains the log-in time associated with the log-in information L inputted by the log-out user out of the log-in time(s) associated with one or more log-in information L stored in the RAM. Hereinafter, the obtained log-in time is called as a log-out user's log-in time TA.

Moreover, the display controlling part 12 obtains the log-in time associated with the log-in information L inputted by the log-in user decided as existence at step S23 out of the log-in time(s) associated with one or more log-in information L stored in the RAM. Hereinafter, the obtained log-in time is called as a log-in user's log-in time TB.

Now, a case where there is a time t (TA<t<TB) from the log-out user's log-in time TA to the log-in user's log-in time TB out of the log-in time(s) associated with one or more log-in information L stored in the RAM may be considered. In such a case, the display controlling part 12 decides that the log-in user is not the next user (step S24: NO), because another user different from the log-out user and the log-in user is logged-in until the log-in user decided as existence at step S23 is logged-in after the log-out user is logged-in.

On the other hand, a case where there is no time t (TA<t<TB) from the log-out user's log-in time TA to the log-in user's log-in time TB out of the log-in time(s) associated with one or more log-in information L stored in the RAM may be considered. In such a case, the display controlling part 12 decides that the log-in user is the next user (step S24: YES), because another user different from the log-out user and the log-in user is not logged-in until the log-in user decided as existence at step S23 is logged-in after the log-out user is logged-in.

If the display controlling part 12 decides at step S22 that the elapsed time exceeds the limit time (step S22: YES) or the display controlling part 12 decides at step S24 that the log-in user is not the next user (step S24: NO), the display controlling part 12 replies an execution instruction of a re-login key non-displaying function to the remote operation device 9 (step S25). After that, the controlling part 10 finishes the re-login process. When the remote operation device 9 receives the execution instruction of the re-login key non-displaying function, the remote operation device 9 does not display (hides) the re-login key KR having been displayed on the log-in operation screen W1a (refer o FIG. 6) in accordance with the execution instruction.

If the display controlling part 12 decides at step S23 that the log-in user does not exist (step S23: NO), the display controlling part, the display controlling part 12 decides whether or not the next user exists (step S26).

Concretely, the display controlling part 12 confirms at step S26 whether or not the log-in information L associated with the log-in time being a time later than the log-in time associated with the log-in information L inputted by the log-out user is stored in the RAM and, according to the confirmed result, decides whether or not the next user exists (step S26).

That is, in a case where the display controlling part 12 decides at step S23 that the log-in user does not exist (step S23: NO) and decides at step S26 that the next user exists (step S26: YES), the display controlling part decides a situation where the log-in user does not exist after the next user is logged-out from the multifunction peripheral 1. In such a case (step S23: NO, and step S26: YES), the display controlling part 12 also replies the execution instruction of the re-login key non-displaying function to the remote operation device 9 (step S25). After that, the controlling part 10 finishes the re-login process.

On the other hand, the display controlling part 12 decides at step S24 that the log-in user is the next user (step S24: YES), a case where the user of the remote operation device 9 carries out the re-login operation touch-operating the re-login key KR (refer to FIG. 6) may be considered (step S27: YES).

In such a case (step S27: YES), the remote operation device 9 transmits the re-login instruction asking of re-login of the log-out user without inputting the log-in information L to the controlling part 10 via the communicating part 25. The log-in managing part 11 starts to execute process of re-login of the log-out user without inputting the log-in information L in accordance with the re-login instruction received by the controlling part 10 (step S28).

Concretely, at step S28, the log-in managing part 11 obtains the log-out user's log-in information L from the RAM. Subsequently, the log-in managing part 11 stores the obtained log-in information L as the reserve log-in information in the RAM (step S28). Similarly, in a case where the display controlling part 12 decides at step S26 that the next user does not exist (step S26: NO), when the re-login operation is carried out (step S27: YES), step S28 is executed. After that, the controlling part 10 finishes the re-login process.

On the other hand, in a case where the display controlling part 12 decides at step S24 that the log-in user is the next user (step S24: YES) and decides at step S26 that the next user does not exist (step S26: NO), when the re-login operation is not carried out (step S27: NO), the action is returned to step S22.

Thus, a case where the re-login process is executed by the controlling part 10 and, step S28, the log-out user's log-in information L is stored as the reserve log-in information in the RAM (step S28) may be considered. In such a case, in the action in FIG. 2, because the reserve log-in information is stored in the RAM (step S1: YES), the log-in managing part 11 decides, similarly to step S3, whether or not the log-in user logging-in to the multifunction peripheral 1 exists (step S13).

The log-in managing part 11 decides at step S13 that the log-in user does not exist (step S13: NO), the log-in managing part 11 obtains the reserve log-in information stored in the RAM as the log-in information L contained in the log-in instruction received from the remote operation device 9 (step S14). After that, the log-in managing part 11 deletes the reserve log-in information stored in the RAM.

Subsequently, the log-in managing part 11 executes step S6. That is, the log-in managing part 11 stores, at step S6, the reserve log-in information obtained as the log-in information L contained in the log-in instruction received from the remote operation device 9 at step S13 with associating with the log-in time in the RAM. Thereby, the log-in managing part 11 makes the log-out user re-login to the multifunction peripheral 1 without inputting the log-in information L.

On the other hand, in a case where the log-in managing part 11 decides at step S13 that the log-in user exists the log-in managing part 11 (step S13: YES), if it is decided at step S24 (refer to FIG. 4) that the log-in user is a next user (step S24: YES) and the re-login operation is carried out (step S27: YES), the log-in managing part 11 decides that the reserve log-in information stored in the RAM is the reserve log-in information to be stored in the RAM.

That is, in such a case (step S13: YES), when it is decided that the next user is logged-in, the log-in managing part 11 shifts the action to the step 10 so as to execute processes of step S14 and thereafter just after the next user was logged-out and the log-in user did not exist.

In other words, in a case where the log-in operation inputting the log-in information L is carried out by the user in the remote operation device 9 (step S2: YES), if the log-in user logging-in to the multifunction peripheral 1 does not exist (step S3: NO), the log-in managing part 11 logs-in the user to the multifunction peripheral 1 (step S4: YES, and step S6). Moreover, in a case where the log-out operation logging-out the user from the multifunction peripheral 1 is carried out by the user in the remote operation device 9 (step S10: YES), the log-in managing part 11 logs-out the user from the multifunction peripheral 1 (step S11).

If the log-in managing part 11 logs-out the user from the multifunction peripheral 1 (step S11), the display controlling part 12 display the re-login key KR asking of re-login of the log-out user logged out from the multifunction peripheral 1 on the displaying part 91 of the remote operation device 9 without inputting the log-in information L (step S21).

Moreover, if operation of the re-login key KR is carried out in the remote operation device 9 (step S27: YES), the log-in managing part 11 logs-in the log-out user to the multifunction peripheral 1 by using the log-in information L used when the log-out user is precedingly logged-in to the multifunction peripheral 1 (step S28, step S14 and step S6).

Therefore, after the user is logged-in to the multifunction peripheral 1 by carrying out the log-in operation inputting the log-in information L in the remote operation device 9, even if the user carried out to log-out from the multifunction peripheral 1, it is possible to immediately re-login to the multifunction peripheral 1 by operating the re-login key KR without consuming time and labor inputting the log-in information L until the limit time is elapsed after log-out.

Thereby, when the user of the remote operation device 9 notices unfinished remote operation of the multifunction peripheral 1 after log-out operation due to mistake of finishing of the remote operation of the multifunction peripheral 1, it is possible to immediately re-login to the multifunction peripheral 1 and to carry out the unfinished remote operation.

The display controlling part 12 is configured, until the predetermined limit time is elapsed after the log-in managing part 11 logs-out the log-out user from the multifunction peripheral 1 (step S21, step S22: YES and step S25), so as to display the re-login key KR on the displaying part 91 of the remote operation device 9.

Therefore, it is possible to reduce a possibility displaying the re-login key KR on the displaying part 91 of the remote operation device 9 for unnecessary long time. Thereby, it is possible to reduce a possibility that another user different from the log-out user uses the remote operation device 9 displaying the re-login key KR. As a result, it is possible to reduce a possibility that another user different from the log-out user illegally logs-in by using the re-login key KR and pretends to be the log-out user.

Moreover, the display controlling part 12 is configured, until the limit time is elapsed after the log-in managing part 11 logs-out the log-out user from the multifunction peripheral 1 (step S22: NO), when the next user logged-in to the multifunction peripheral 1 next to the log-out user does not exist (step S26: NO) or when the next user is logged-in (step S24: YES), so as to display the re-login key KR on the displaying part 91 of the remote operation device 9 (step S21).

Therefore, when the next user does not exist or when the next user is logged-in to the multifunction peripheral 1, i.e. when the user logged-out from the multifunction peripheral 1 next to the log-out user does not exist, it is possible to display the re-login key KR on the displaying part 91 of the remote operation device 9.

Thereby, it is possible to prevent the re-login key KR from being displayed on the remote operation device 9 used by another user different from the log-out user when the re-login key KR is displayed on the remote operation device 9 used by the log-out user. As a result, it is possible to reduce a possibility that process of re-login of the user to the multifunction peripheral 1 is complicated, e.g. that necessity determining the user as the subject of re-login in some way is caused when the re-login keys KR displayed on a plurality of remote operation devices 9 are simultaneously operated.

Moreover, the display controlling part 12 is configured, until the limit time is elapsed after the log-in managing part 11 logs-out the log-out user from the multifunction peripheral 1 (step S22: NO), when the next user logged-in to the multifunction peripheral 1 next to the log-out user is logged-out from the multifunction peripheral 1 (step S26: YES), so as to make the displaying part 91 not display (hide) the re-login key KR on (step S25).

Therefore, when the next user is logged-out and a plurality of log-out users exists, it is possible to prevent the re-login keys KR from being displayed on the remote operation devices 9 respectively used by the plurality of log-out users. Thereby, for example, it is possible to reduce a possibility that process of re-login of the user to the multifunction peripheral 1 is complicated, e.g. that necessity determining the user as the subject of re-login in some way is caused when the re-login keys KR displayed on the plurality of remote operation devices 9 are simultaneously operated.

Moreover, the log-in managing part 11 is configured, in a case where operation of the re-login key KR is carried out in the remote operation device 9, when the next user logged-in to the multifunction peripheral 1 next to the log-out user is logging-in (step S24: YES, step S27: YES, step S28, step S1: YES and step S13: YES), so as to log-in the log-out user to the multifunction peripheral 1 by using the log-in information L inputted when the log-out user is precedingly logged-in to the multifunction peripheral 1 just after the next user is logged-out (step S10: YES, step S1*a*, step S1: YES, step S13: NO, step S14 and step S6).

Therefore, it is possible to make the log-out user re-login after the log-out user operated the re-login keys KR waits until the next user is logged-out at the latest. That is, it is possible to reduce a possibility making the user, who operates the re-login keys KR to immediately re-login, wait for long time.

Incidentally, the above-described embodiment is an example of an embodiment according to the present disclosure, but does not restrict the disclosure to the above-described embodiment. For example, the disclosure may be actualized in improved embodiments mentioned later.

For example, in one improved embodiment, in a case where operation of the re-login keys KR is carried out in the remote operation device 9, when the next user logged-in to the multifunction peripheral 1 next to the log-out user is logging-in, the log-in managing part 11 may ignore the operation of the re-login keys KR.

That is, in a case where the display controlling part 12 decides at step S24 that the log-in user is the next user (step S24: YES), even if the re-login operation is carried out (step S27: YES), the action may be returned to step S22 without advancing to step S28. In such a case, the log-in managing part 11 may reply an execution instruction of a function displaying a message of an impossibility of the re-login operation on the displaying part 91 to the remote operation device 9 before returning to step S22.

In another improved embodiment, until the limit time is elapsed after the log-in managing part 11 logs-out the log-out user from the multifunction peripheral 1, when the next user logged-in to the multifunction peripheral 1 next to the log-out user is logged-out from the multifunction peripheral 1, the display controlling part 12 may not execute process not-displaying (hiding) the re-login keys KR.

That is, step S26 may be omitted and, when the display controlling part 12 decides at step S23 that the log-in user does not exist (step S23: NO), the action may be advanced to step S27.

In a further improved embodiment, until the limit time is elapsed after the log-in managing part 11 logs-out the log-out user from the multifunction peripheral 1, even if the log-in user exists after the next user is logged-out, the re-login keys KR may be displayed on the displaying part 91 of the remote operation device 9.

That is, step S23, step S24 and step S26 may be omitted and, when the limit time is elapsed after the log-in managing part 11 logs-out the log-out user from the multifunction peripheral 1 (step S22: NO), the action may be advanced to step S27.

In a furthermore improved embodiment, after the limit time is elapsed after the log-in managing part 11 logs-out the log-out user from the multifunction peripheral 1, the display controlling part 12 may make the remote operation device 9 display the re-login key KR on the displaying part 91. That is, steps S22-S26 may be omitted and the action may be advanced to step S27 after step S21.

While the present disclosure has been described with reference to the preferable embodiment of the image forming apparatus of the disclosure and the description has technical preferable illustration, the disclosure is not to be restricted by the embodiment and illustration. Components in the embodiment of the present disclosure may be suitably changed or modified, or variously combined with other components. The claims are not restricted by the description of the embodiment.

What is claimed is:

1. An electronic apparatus operated by a remote operation device, comprising:

a central processing unit executing stored instructions to perform functions of:

a log-in managing part configured, in a case where log-in operation inputting log-in information, which includes a username and password, is carried out by a user in the remote operation device, if a log-in user logging-in to the electronic apparatus does not exist, so as to log-in the user to the electronic apparatus, and, in a case where log-out operation logging-out the user from the electronic apparatus is carried out by the user in the remote operation device, so as to log-out the user from the electronic apparatus; and a display controlling part configured, if the log-in managing part logs-out the user from the electronic apparatus, so as to display a re-login key asking of re-login of a log-out user logged-out from the electronic apparatus on a displaying part of the remote operation device without inputting the log-in information, wherein the log-in managing part is configured, if operation of the re-login key is carried out in the remote operation device, so as to log-in the log-out user to the electronic apparatus by using the log-in information used when the log-out user is precedingly logged-in to the electronic apparatus without further input of log-in information, wherein the display controlling part is configured, until a predetermined limit time is elapsed after the log-in managing part logs-out the log-out user from the electronic apparatus and the re-login key is hidden from display after the elapsed predetermined limit time, so as to display the re-login key on the displaying part of the remote operation device, wherein the predetermined limit time starts when the display controlling part displays a re-login key asking of re-login of the log-out user logged-out from the electronic apparatus on the displaying part of the remote operation device.

2. The electronic apparatus according to claim 1, wherein the display controlling part is configured, until the predetermined limit time is elapsed after the log-in managing part logs-out the log-out user from the electronic apparatus, when a next user logged-in to the electronic apparatus next to the log-out user does not exist or when the next user is logged-in, so as to display the re-login key on the displaying part of the remote operation device.

3. The electronic apparatus according to claim 1, wherein the display controlling part is configured, until the predetermined limit time is elapsed after the log-in managing part logs-out the log-out user from the electronic apparatus, when the next user logged-in to the electronic apparatus next to the log-out user is logged-out from the electronic apparatus, so as to make the remote operation device not display the re-login key.

4. The electronic apparatus according to claim 1, wherein the log-in managing part is configured, in a case where operation of the re-login key is carried out in the remote operation device, when a next user logged-in to the electronic apparatus next to the log-out user is logging-in, so as to log-in the log-out user to the electronic apparatus by using the log-in information just after the next user is logged-out.

5. A remote operation system comprising:

a remote operation device; and an electronic apparatus operated by the remote operation device, wherein the electronic apparatus includes:

a central processing unit executing stored instructions to perform functions of:

a log-in managing part configured, in a case where log-in operation inputting log-in information, which includes a username and password, is carried out by a user in the remote operation device, if a log-in user logging-in to the electronic apparatus does not exist, so as to log-in the user to the electronic apparatus, and, in a case where log-out operation logging-out the user from the electronic apparatus is carried out by the user in the remote operation device, so as to log-out the user from the electronic apparatus; and a display controlling part configured, if the log-in managing part logs-out the user from the electronic apparatus, so as to display a re-login key asking of re-login of a log-out user logged-out from the electronic apparatus on a displaying part of the remote operation device without inputting the log-in information, wherein the log-in managing part is configured, if operation of the re-login key is carried out in the remote operation device, so as to log-in the log-out user to the electronic apparatus by using the log-in information used when the log-out user is precedingly logged-in to the electronic apparatus without further input of log-in information, wherein the display controlling part is configured, until a predetermined limit time is elapsed after the log-in managing part logs-out the log-out user from the electronic apparatus and the re-login key is hidden from display, so as to display the re-login key on the displaying part of the remote operation device, wherein the predetermined limit time starts when the display controlling part displays a re-login key asking of re-login of the log-out user logged-out from the electronic apparatus on the displaying part of the remote operation device.

* * * * *